(12) United States Patent
Zhu et al.

(10) Patent No.: US 11,306,695 B2
(45) Date of Patent: Apr. 19, 2022

(54) DEVICE AND METHOD FOR SWINGING POWER GENERATION AND VIBRATION SUPPRESSION BY USING ARC-SHAPED WING PLATES WITH ROUGH SURFACES

(71) Applicant: Southwest Petroleum University, Chengdu (CN)

(72) Inventors: Hongjun Zhu, Chengdu (CN); Xin Chu, Chengdu (CN); Hongye Liu, Chengdu (CN); Zhiqi Ding, Chengdu (CN); Shuo Wang, Chengdu (CN); Huazhong Su, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/151,202

(22) Filed: Jan. 17, 2021

(65) Prior Publication Data
US 2021/0239087 A1    Aug. 5, 2021

(30) Foreign Application Priority Data
Feb. 2, 2020    (CN) .......................... 202010085455.3

(51) Int. Cl.
*F03B 17/06*    (2006.01)
*F15D 1/00*    (2006.01)

(52) U.S. Cl.
CPC ............ *F03B 17/065* (2013.01); *F15D 1/003* (2013.01); *F15D 1/0055* (2013.01)

(58) Field of Classification Search
CPC ....... F03B 17/065; F15D 1/003; F15D 1/0055
See application file for complete search history.

(56) References Cited

U.S. PATENT DOCUMENTS

2021/0246734 A1* 8/2021 Zhu ...................... F15D 1/0065

* cited by examiner

*Primary Examiner* — Viet P Nguyen
(74) *Attorney, Agent, or Firm* — Bochner IP, PLLC; Andrew D. Bochner (57) ABSTRACT

The present disclosure relates to a device and a method for swinging power generation and vibration suppression by using arc-shaped wing plates with rough surfaces. The device consists of two parts, namely, a rotary swinging system and a collector system. The rotary swinging system includes a collector riser, steering bearings, nanometer material arc-shaped power generation wing plates, and flexible tail plates. The collector system includes telescopic power generation cylinders, a waterproof electric slip ring, and a waterproof power transmission line. The suppression of energy-consumption-free vortex-induced vibration is realized under the combined action that the nanometer material arc-shaped power generation wing plates divide a flowing space and adjust a flow direction, the nanometer material arc-shaped power generation wing plates drive the flexible tail plates to swing to destroy a tail vortex street, and hemispherical bulges and trumpet-shaped deflector holes disturb a boundary layer around flow.

2 Claims, 5 Drawing Sheets

DEVICE AND METHOD FOR SWINGING POWER GENERATION AND VIBRATION SUPPRESSION BY USING ARC-SHAPED WING PLATES WITH ROUGH SURFACES

TECHNICAL FIELD

The present disclosure belongs to the technical field of development and utilization of marine new energy and vortex-induced vibration suppression, and particularly relates to a device and a method for swinging power generation and vibration suppression by using arc-shaped wing plates with rough surfaces.

BACKGROUND

Energy is the material basis for human survival and all production activities. Major issues, such as the contradiction between economic development and energy shortage, the contradiction between over exploitation of traditional energy and sharp deterioration of the living environment as well as international energy, and energy security, have attracted great attention at home and abroad. Marine energy has been paid more and more attention by coastal countries because of having the characteristics of renewability, environmental friendliness, and abundant reserves. Large scale scientific and effective utilization of the marine energy is of far-reaching significance to promote the sustainable development of national economy.

The development of marine economy is not only helpful for China to break through the bottleneck of resources and accelerate the transformation of new and old kinetic energy, but also an important way to expand internal demand and promote the sustained growth of the national economy. In the process of developing marine oil and gas resources, there are inevitable vortex-induced vibration problems of marine structures, such as marine risers, lifting pipes, water resisting risers, and platform pile legs, which threaten the safe operation of structures. The development and utilization of the marine energy also depend on a variety of marine structures in bluff body forms, and also has a wide range of hidden dangers of vortex induced vibration. How to effectively suppress the vortex-induced vibration of the structures, collect the energy generated by the vibration, convert the collected energy into electric energy, turn harm into benefit, kill two birds with one stone, and realize self-energy supply of marine equipment is an urgent research direction.

SUMMARY

The objective of the present disclosure is to provide a more efficient and environment friendly device and method for swinging power generation and vibration suppression by using arc-shaped wing plates with rough surfaces with respect to the problems and deficiencies proposed in the current BACKGROUND.

To achieve the above objective, the present disclosure adopts the following technical solution:

The present disclosure relates to a device for swinging power generation and vibration suppression by using arc-shaped wing plates with rough surfaces. The device consists of two parts, namely, a rotary swinging system and a collector system. The rotary swinging system includes a collector riser, two steering bearings, two nanometer material arc-shaped power generation wing plates, and two flexible tail plates. The collector system includes three telescopic power generation cylinders, a waterproof electric slip ring, and a waterproof power transmission line.

The steering bearing is of an inner-outer ring structure embedded with a cylindrical roller. The inside diameter of the steering bearing is equal to the outside diameter of the collector riser. The upper and lower steering bearings are mounted on the outer wall of the collector riser at an interval of the height of one nanometer material arc-shaped power generation wing plate. Two cylindrical holes are symmetrically formed in the outer wall of the steering bearing. A cylindrical rotating shaft is inserted into the two cylindrical holes. One end of the nanometer material arc-shaped power generation wing plate is mounted on the cylindrical rotating shaft in a sleeving manner, so that the two nanometer material arc-shaped power generation wing plates are symmetrically mounted on the two sides of the outer walls of the steering bearings. The concave surfaces of the two nanometer material arc-shaped power generation wing plates face each other, and the convex surfaces of the two nanometer material arc-shaped power generation wing plates face outside. The nanometer material arc-shaped power generation wing plates may drive the outer rings of the steering bearings to rotate around the collector riser, and may also swing around the cylindrical rotating shaft.

The nanometer material arc-shaped power generation wing plates are made of a zinc oxide material. Four rows of trumpet-shaped deflector holes are uniformly formed in the surface of the nanometer material arc-shaped power generation wing plate in the horizontal direction, so that the holes in the concave surface of the corresponding nanometer material arc-shaped power generation wing plate are small holes, and the holes in the convex surface of the corresponding nanometer material arc-shaped power generation wing plate are large holes. Hemispherical bulges are formed between every two rows of the trumpet-shaped deflector holes in the convex surface of the nanometer material arc-shaped power generation wing plate. The radius of the hemispherical bulge is twice the radius of the large hole of the trumpet-shaped deflector hole. The hemispherical bulges are filled with the zinc oxide material. Cylindrical rotating shaft inserting holes are formed in both ends of the nanometer material arc-shaped power generation wing plate. Three telescopic power generation cylinders are mounted in the middle of the nanometer material arc-shaped power generation wing plates at equal distance in the vertical direction.

One telescopic power generation cylinder consists of a magnetic pole sleeve, four arc-shaped magnets, a spring, and two wing plate struts wound with coils. The magnetic pole sleeve is hollow, and one spring is placed therein. Two arc-shaped holes are symmetrically formed in the end surface of each side of the magnetic pole sleeve. An arc-shaped magnet is placed in each arc-shaped hole. The magnetic poles are opposite for the arc-shaped magnets in the two arc-shaped holes of the same side of the magnetic pole sleeve. A circuit channel interface is formed in the middle of the magnetic pole sleeve. The diameter of the wing plate strut wound with the coil is equal to the inside diameter of the magnetic pole sleeve. The two wing plate struts are respectively connected to the two ends of the spring in the magnetic pole sleeve. The other ends of the two wing plate struts are fixed to the concave surfaces of the two nanometer material arc-shaped power generation wing plates that are arranged opposite to each other.

A cylindrical hole is formed in one end of the flexible tail plate. A cylindrical rotating shaft is inserted into the cylindrical hole. The flexible tail plate is mounted at the tail end of the nanometer material arc-shaped power generation wing plate in a sleeving manner through the cylindrical rotating shaft, so that the flexible tail plate may swing around the cylindrical rotating shaft. The height and the thickness of the flexible tail plate are respectively equal to the height and the thickness of the nanometer material arc-shaped power generation wing plate.

The waterproof electric slip ring is mounted in the middle of the collector riser between the two steering bearings. An electric brush orbit and an electric energy transmission channel are formed in the outer wall of the inner ring of the waterproof electric slip ring. A female row and a male row of electric brushes are arranged on the inner wall of the outer ring of the waterproof electric slip ring. The electric brushes are in contact with the electric brush orbit in the outer wall of the inner ring. The circuit channel interface is formed in the outer wall of the outer ring of the waterproof electric slip ring. The circuit channel interface of the magnetic pole sleeve is connected to the circuit channel interface of the waterproof electric slip ring through the waterproof power transmission line.

A method for swinging power generation and vibration suppression by using arc-shaped wing plates with rough surfaces is provided by utilizing the device for swinging power generation and vibration suppression by using the arc-shaped wing plates with the rough surfaces. When there are attack angles between the nanometer material arc-shaped power generation wing plates and the flow direction of a marine current, the nanometer material arc-shaped power generation wing plates rotate and extrude under the impact of the marine current and drive the steering bearings to rotate until the nanometer material arc-shaped power generation wing plates rotate to the counter flow side of the collector riser. The nanometer material arc-shaped power generation wing plates also promote the telescopic power generation cylinders to stretch and retract while rotating and driving the steering bearings to rotate, so that the arc-shaped magnets and induction coils displace relatively to form induced current. The nanometer material arc-shaped power generation wing plates may bend or deform under the impact of the marine current. Because zinc oxide has dual effects of a semiconductor and piezoelectricity, and an electric potential may be generated at the two ends when a zinc oxide wire is bent, current is generated. In addition, under the combined action of the impact of the marine current and the stretching and retracting of the springs, the nanometer material arc-shaped power generation wing plates drive the flexible tail plates to swing reciprocally, which destroys the shedding and development of a wake vortex of the collector riser. Meanwhile, the swinging of the nanometer material arc-shaped power generation wing plates makes the trumpet-shaped deflector holes produce a jet effect, which allocates a flow field at the tail of the collector riser, and destroys the development of a boundary layer of the surface of the nanometer material arc-shaped power generation wing plate. The hemispherical bulges on the convex surfaces of the nanometer material arc-shaped power generation wing plates increase the surface roughness, and also bring disturbance to the boundary layer around the flow. Therefore, the boundary layer around the flow of the collector riser is deeply destroyed, a separation point of the boundary layer is changed, a three-dimensional structure of the wake vortex is destroyed, the formation and development of the vortex are suppressed, and the suppression of energy consumption-free vortex-induced vibration is realized under the combined action that the nanometer material arc-shaped power generation wing plates divide a flowing space and adjust a flow direction, the nanometer material arc-shaped power generation wing plates drive the flexible tail plates to swing to destroy a tail vortex street, and the hemispherical bulges and the trumpet-shaped deflector holes disturb the boundary layer around flow. In addition, the bending and the deforming of the nanometer material arc-shaped power generation wing plates, the deforming of the hemispherical bulges, and the reciprocating stretching and retracting of the telescopic power generation cylinders produce current, which realizes the conversion of marine current energy while suppressing the vortex-induced vibration.

Due to the adoption of the technical solution above, the present disclosure has the following advantages:

1. the nanometer material arc-shaped power generation wing plates of the device of the present disclosure may rotate under the impact of the marine current to effectively drive the flexible tail plates to swing and rotate, so that the overall device is adapted to the marine environment with changing flow directions;

2. the bending and the deforming of the nanometer material arc-shaped power generation wing plates, the deforming of the hemispherical bulges, and the reciprocating stretching and retracting of the telescopic power generation cylinders produce current, so that the function of multiple power generation is realized;

3. the device of the present disclosure generates power by using non-uniform flow filed of the marine current around the collector riser, so the power generation mode is green and environment friendly;

4. the wake vortex of the collector riser is effectively destroyed by the trumpet-shaped deflector holes in the nanometer material arc-shaped power generation wing plates of the device of the present disclosure, which enhances a vibration suppression effect;

5. the device of the present disclosure may be mounted on the collector riser in series as a basic unit, which realizes large-scale power output.

In the drawings: 1—collector riser; 2—nanometer material arc-shaped power generation wing plate; 3—flexible tail plate; 4—waterproof electric slip ring; 5—trumpet-shaped deflector hole; 6—hemispherical bulge; 7—arc-shaped magnet; 8—spring; 9—steering bearing; 10—waterproof power transmission line; 11—wing plate strut; 12—magnetic pole sleeve.

DETAILED DESCRIPTION

Specific implementation of the present disclosure will be further described below with reference to the accompanying drawings.

Figure 1:
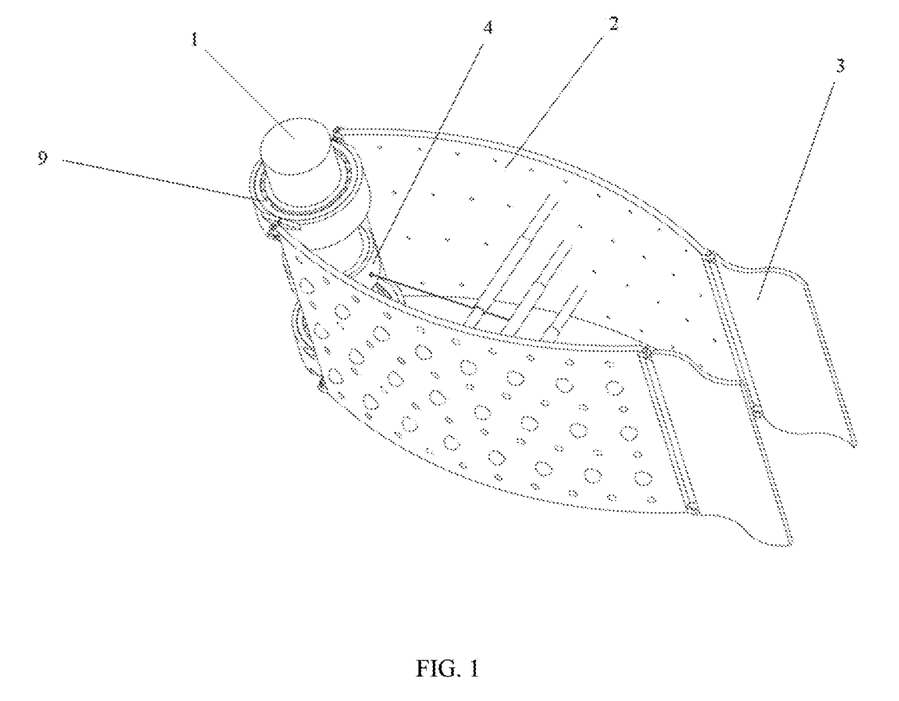
FIG. 1 is a schematic structural diagram of an overall structure of a device of the present disclosure.

A device for swinging power generation and vibration suppression by using arc-shaped wing plates with rough surfaces consists of two parts, namely, a rotary swinging system and a collector system. The rotary swinging system includes a collector riser 1, two steering bearings 9, two nanometer material arc-shaped power generation wing plates 2, and two flexible tail plates 3. The collector system includes three telescopic power generation cylinders, a waterproof electric slip ring 4, and a waterproof power transmission line 10.

Figure 5:
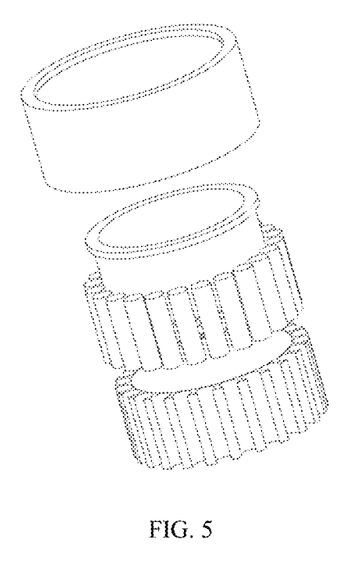
FIG. 5 is a split schematic diagram of a steering bearing of the device of the present disclosure.

The steering bearing 9 is of an inner-outer ring structure embedded with a cylindrical roller. The inside diameter of the steering bearing 9 is equal to the outside diameter of the collector riser 1. The upper and lower steering bearings 9 are mounted on the outer wall of the collector riser 1 at an interval of the height of one nanometer material arc-shaped power generation wing plate 2. Two cylindrical holes are symmetrically formed in the outer wall of the steering bearing 9. A cylindrical rotating shaft is inserted into the two cylindrical holes. One end of the nanometer material arc-shaped power generation wing plate 2 is mounted on the cylindrical rotating shaft in a sleeving manner, so that the two nanometer material arc-shaped power generation wing plates 2 are symmetrically mounted on the two sides of the outer walls of the steering bearings 9. The concave surfaces of the two nanometer material arc-shaped power generation wing plates face each other, and the convex surfaces of the two nanometer material arc-shaped power generation wing plates face outside. The nanometer material arc-shaped power generation wing plates 2 may drive the outer rings of the steering bearings 9 to rotate around the collector riser 1, and may also swing around the cylindrical rotating shaft.

Figure 2:
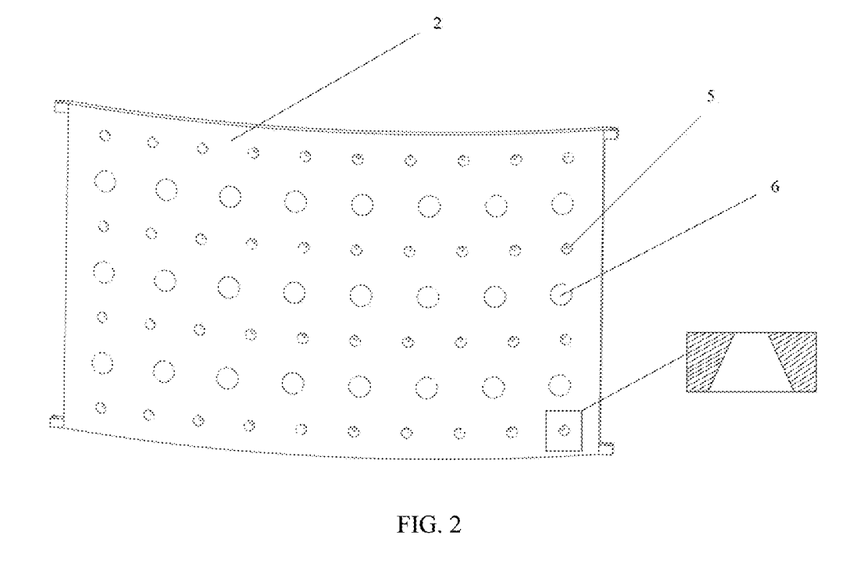
FIG. 2 is a schematic diagram of an arc-shaped wing plate with a rough surface of the device of the present disclosure.

The nanometer material arc-shaped power generation wing plates 2 are made of a zinc oxide material. Four rows of trumpet-shaped deflector holes 5 are uniformly formed in the surface of the nanometer material arc-shaped power generation wing plate in the horizontal direction, so that the holes in the concave surface of the corresponding nanometer material arc-shaped power generation wing plate 2 are small holes, and the holes in the convex surface of the corresponding nanometer material arc-shaped power generation wing plate 2 are large holes. The hemispherical bulges 6 are arranged between every two rows of the trumpet-shaped deflector holes 5 in the convex surface of the nanometer material arc-shaped power generation wing plate 2. The radius of the hemispherical bulge 6 is twice the radius of the large hole of the trumpet-shaped deflector hole 5. The hemispherical bulges 6 are filled with the zinc oxide material. Cylindrical rotating shaft inserting holes are formed in both ends of the nanometer material arc-shaped power generation wing plate 2. Three telescopic power generation cylinders are mounted in the middle of the nanometer material arc-shaped power generation wing plates 2 at equal distance in the vertical direction.

Figure 4:
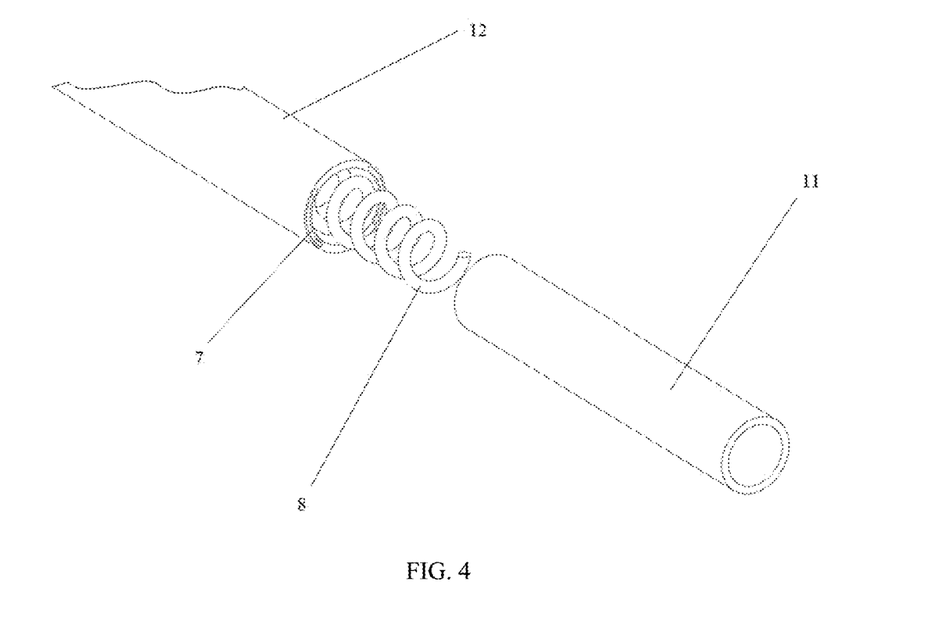
FIG. 4 is a split schematic diagram of a telescopic power generation cylinder of the device of the present disclosure.

One telescopic power generation cylinder consists of a magnetic pole sleeve 12, four arc-shaped magnets 7, a spring 8, and two wing plate struts 11 wound with coils. The magnetic pole sleeve 12 is hollow, and one spring 8 is placed therein. Two arc-shaped holes are symmetrically formed in the end surface of each side of the magnetic pole sleeve 12. An arc-shaped magnet 7 is placed in each arc-shaped hole. The magnetic poles are opposite for the arc-shaped magnets 7 in the two arc-shaped holes of the same side of the magnetic pole sleeve 12. A circuit channel interface is formed in the middle of the magnetic pole sleeve 12. The diameter of the wing plate strut 11 wound with the coil is equal to the inside diameter of the magnetic pole sleeve 12.

The two wing plate struts 11 are respectively connected to the two ends of the spring 8 in the magnetic pole sleeve 12. The other ends of the two wing plate struts 11 are fixed to the concave surfaces of the two nanometer material arc-shaped power generation wing plates 2 that are arranged opposite to each other.

A cylindrical hole is formed in one end of the flexible tail plate 3. A cylindrical rotating shaft is inserted into the cylindrical hole. The flexible tail plate 3 is mounted at the tail end of the nanometer material arc-shaped power generation wing plate 2 in a sleeving manner through the cylindrical rotating shaft, so that the flexible tail plate 3 may swing around the cylindrical rotating shaft. The height and the thickness of the flexible tail plate 3 are respectively equal to the height and the thickness of the nanometer material arc-shaped power generation wing plate 2.

Figure 3:
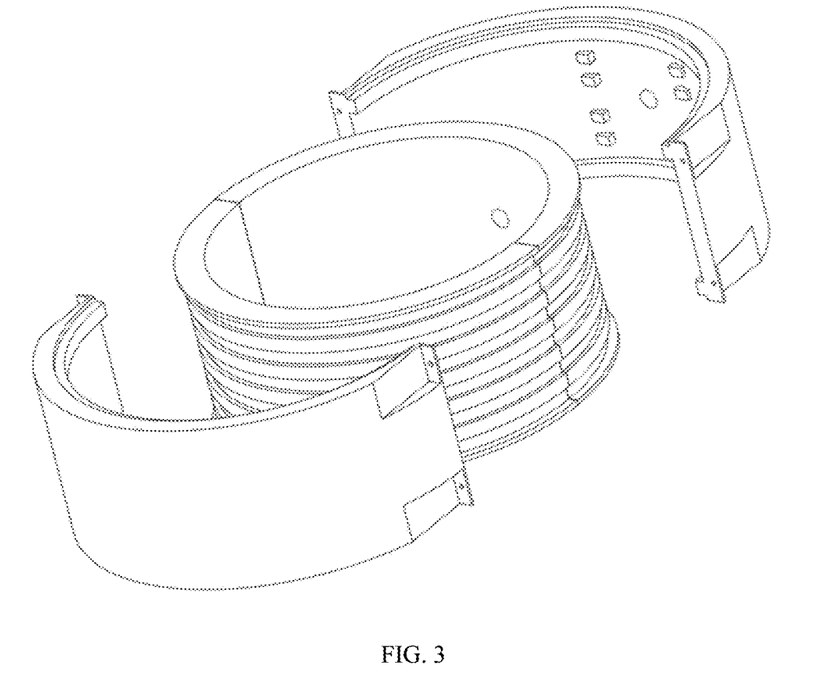
FIG. 3 is a split schematic diagram of a waterproof electric slip ring of the device of the present disclosure.
Figure 6:
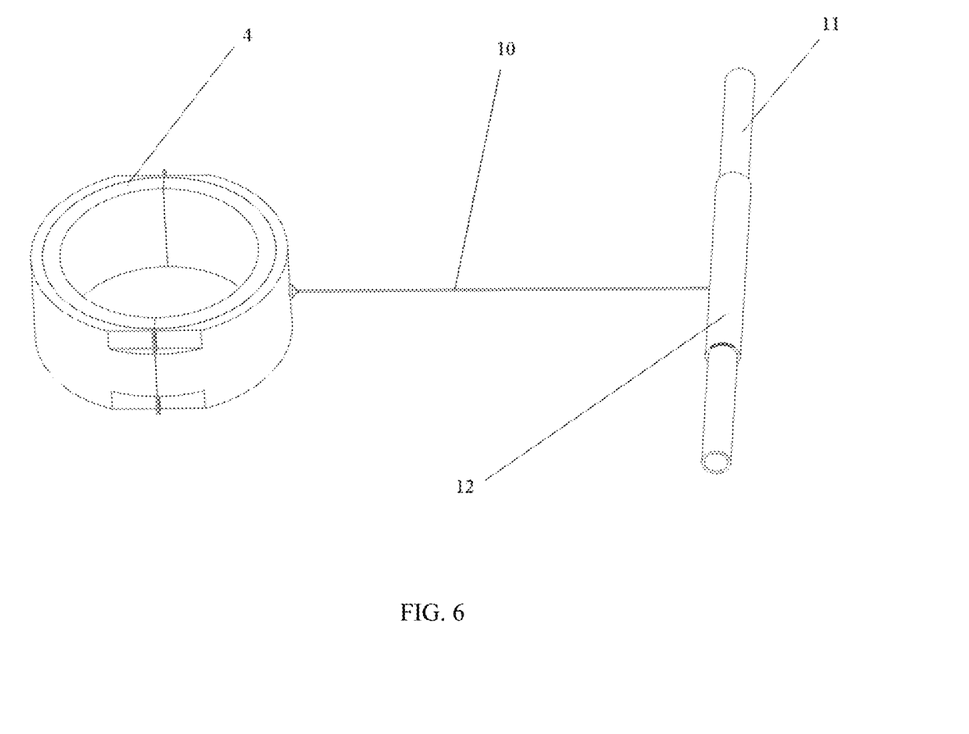
FIG. 6 is a schematic installation diagram of a waterproof power transmission line of the device of the present disclosure.
Figure 7:
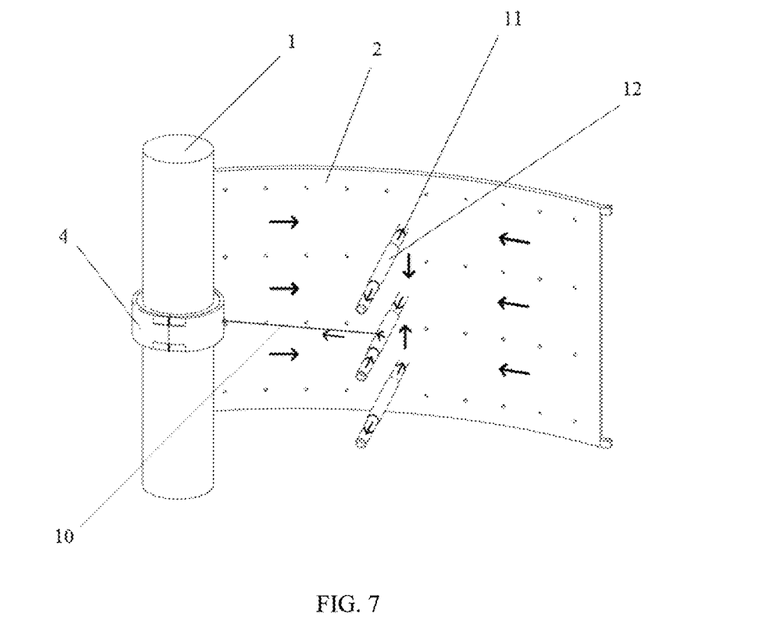
FIG. 7 is a schematic diagram of a circuit of the device of the present disclosure.

The waterproof electric slip ring 4 is mounted in the middle of the collector riser 1 between the two steering bearings 9. An electric brush orbit and an electric energy transmission channel are formed in the outer wall of the inner ring of the waterproof electric slip ring 4. A female row and a male row of electric brushes are arranged on the inner wall of the outer ring of the waterproof electric slip ring 4. The electric brushes are in contact with the electric brush orbit in the outer wall of the inner ring. The circuit channel interface is formed in the outer wall of the outer ring of the waterproof electric slip ring 4. The circuit channel interface of the magnetic pole sleeve 12 is connected to the circuit channel interface of the waterproof electric slip ring 4 through the waterproof power transmission line 10.

Figure 8:
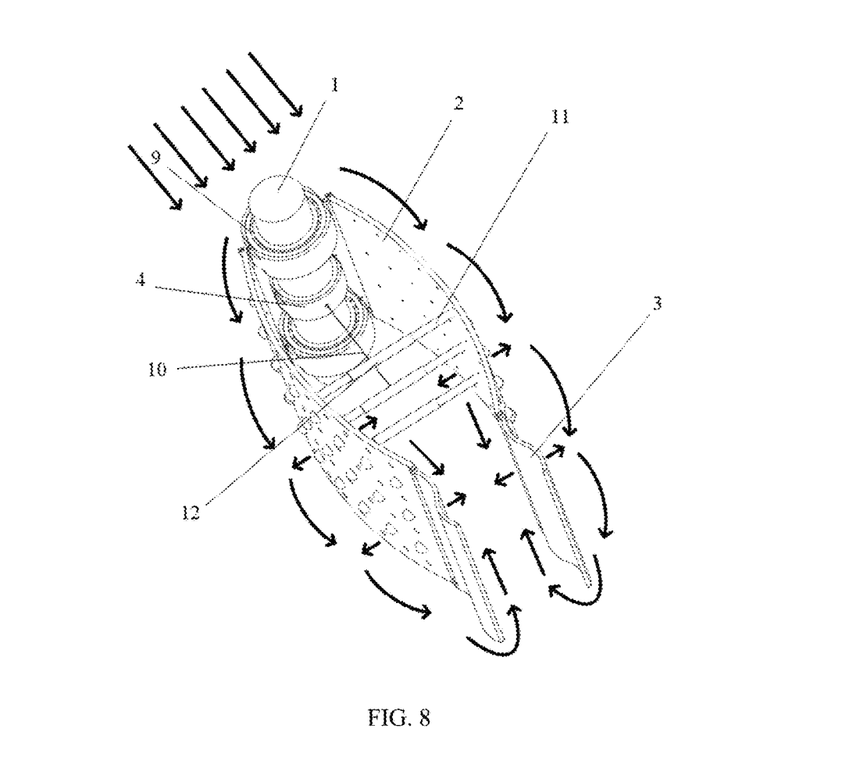
FIG. 8 is a schematic diagram of suppression work of the device of the present disclosure.

A method for swinging power generation and vibration suppression by using arc-shaped wing plates with rough surfaces is provided by utilizing the device for swinging power generation and vibration suppression by using the arc-shaped wing plates with the rough surfaces. When there are attack angles between the nanometer material arc-shaped power generation wing plates 2 and the flow direction of a marine current, the nanometer material arc-shaped power generation wing plates 2 rotate and extrude under the impact of the marine current and drive the steering bearings 9 to rotate until the nanometer material arc-shaped power generation wing plates 2 rotate to the counter flow side of the collector riser 1. The nanometer material arc-shaped power generation wing plates 2 also promote the telescopic power generation cylinders to stretch and retract while rotating and driving the steering bearings 9 to rotate, so that the arc-shaped magnets 7 and induction coils displace relatively to form induced current. The nanometer material arc-shaped power generation wing plates 2 bend or deform under the impact of the marine current. Because zinc oxide has dual effects of a semiconductor and piezoelectricity, and an electric potential may be generated at both ends when a zinc oxide wire is bent, current is generated. In addition, under the combined action of the impact of the marine current and the stretching and retracting of the springs 8, the nanometer material arc-shaped power generation wing plates 2 drive the flexible tail plates 3 to swing reciprocally, which destroys the shedding and development of a wake vortex of the collector riser 1. Meanwhile, the swinging of the nanometer material arc-shaped power generation wing plates 2 makes the trumpet-shaped deflector holes 5 produce a jet effect, which allocates a flow field at the tail of the collector riser 1, and destroys the development of a boundary layer of the surface of the nanometer material arc-shaped power generation wing plate 2. The hemispherical bulges 6 on the convex surfaces of the nanometer material arc-shaped power generation wing plates 2 increase the surface roughness, and also bring disturbance to the boundary layer around the flow. Therefore, the boundary layer around the flow of the collector riser 1 is deeply destroyed, a separation point of the boundary layer is changed, a three-dimensional structure of the wake vortex is destroyed, the formation and development of the vortex are suppressed, and the suppression of energy consumption-free vortex-induced vibration is realized under the combined action that the nanometer material arc-shaped power generation wing plates 2 divide a flowing space and adjust a flow direction, the nanometer material arc-shaped power generation wing plates 2 drive the flexible tail plates 3 to swing to destroy a tail vortex street, and the hemispherical bulges 6 and the trumpet-shaped deflector holes 5 disturb the boundary layer around flow. In addition, the bending and the deforming of the nanometer material arc-shaped power generation wing plates 2, the deforming of the hemispherical bulges 6, and the reciprocating stretching and retracting of the telescopic power generation cylinders produce current, which realizes the conversion of marine current energy while suppressing the vortex-induced vibration.

Embodiment

When the device of the present disclosure is mounted, first, the steering bearings 9 and the waterproof electric slip ring 4 are mounted; the distance between the upper and lower steering bearings 9 is determined according to the height of the nanometer material arc-shaped power generation wing plates 2; the position of the waterproof electric slip ring 4 is located in the middle of the upper and lower steering bearings 9; the upper and lower steering bearings 9 and the waterproof electric slip ring 4 are respectively mounted on the collector riser 1 in a sleeving manner.

Then, the nanometer material arc-shaped power generation wing plates 2 are mounted. One end of the nanometer material arc-shaped power generation wing plate 2 is mounted on the cylindrical rotating shafts of the outer walls of the steering bearings 9 in a sleeving manner, so that the two nanometer material arc-shaped power generation wing plates 2 are symmetrically mounted on the two sides of the outer walls of the steering bearings 9. The concave surfaces of the two nanometer material arc-shaped power generation wing plates face each other, and the convex surfaces of the two nanometer material arc-shaped power generation wing plates face outside. The nanometer material arc-shaped power generation wing plates 2 may drive the outer rings of the steering bearings 9 to rotate around the collector riser 1, and may also swing around the cylindrical rotating shaft.

Next, the telescopic power generation cylinders and the waterproof power transmission line 10 are mounted. One end of each of the two wing plate struts 11 at the two ends of each telescopic power generation cylinder are fixed to the concave surfaces of the two nanometer material arc-shaped power generation wing plates 2 that are arranged oppositely. The other ends of the two wing plate struts 11 are connected to the spring in the magnetic pole sleeve 12. The circuit channel interface of the magnetic pole sleeve 12 is connected to the circuit channel interface of the waterproof electric slip ring 4 through the waterproof power transmission line 10.

Finally, the flexible tail plates 3 are mounted. The flexible tail plates 3 are mounted at the tail ends of the nanometer material arc-shaped power generation wing plates 2 in a sleeving manner through the cylindrical rotating shafts, so that the flexible tail plates 3 may swing around the cylindrical rotating shaft.

After the installation is completed, the device is placed in the marine current. When there are attack angles between the nanometer material arc-shaped power generation wing plates 2 and the flow direction of a marine current, the nanometer material arc-shaped power generation wing plates 2 rotate and extrude under the impact of the marine current and drive the steering bearings 9 to rotate until the nanometer material arc-shaped power generation wing plates 2 rotate to the counter flow side of the collector riser 1. The nanometer material arc-shaped power generation wing plates 2 also promote the telescopic power generation cylinders to stretch and retract while rotating and driving the steering bearings 9 to rotate, so that the arc-shaped magnets 7 and induction coils displace relatively to form induced current. The nanometer material arc-shaped power generation wing plates 2 bend or deform under the impact of the marine current. Because zinc oxide has dual effects of a semiconductor and piezoelectricity, and an electric potential may be generated at both ends when a zinc oxide wire is bent, current is generated. In addition, under the combined action of the impact of the marine current and the stretching and retracting of the springs 8, the nanometer material arc-shaped power generation wing plates 2 drive the flexible tail plates 3 to swing reciprocally, which destroys the shedding and development of a wake vortex of the collector riser 1. Meanwhile, the swinging of the nanometer material arc-shaped power generation wing plates 2 makes the trumpet-shaped deflector holes 5 produce a jet effect, which allocates a flow field at the tail of the collector riser 1, and destroys the development of a boundary layer of the surface of the nanometer material arc-shaped power generation wing plate 2. The hemispherical bulges 6 on the convex surfaces of the nanometer material arc-shaped power generation wing plates 2 increase the surface roughness, and also bring disturbance to the boundary layer around the flow. Therefore, the boundary layer around the flow of the collector riser 1 is deeply destroyed, a separation point of the boundary layer is changed, a three-dimensional structure of the wake vortex is destroyed, the formation and development of the vortex are suppressed, and the suppression of energy consumption-free vortex-induced vibration is realized under the combined action that the nanometer material arc-shaped power generation wing plates 2 divide a flowing space and adjust a flow direction, the nanometer material arc-shaped power generation wing plates 2 drive the flexible tail plates 3 to swing to destroy a tail vortex street, and the hemispherical bulges 6 and the trumpet-shaped deflector holes 5 disturb the boundary layer around flow. In addition, the bending and the deforming of the nanometer material arc-shaped power generation wing plates 2, the deforming of the hemispherical bulges 6, and the reciprocating stretching and retracting of the telescopic power generation cylinders produce current, which realizes the conversion of marine current energy while suppressing the vortex-induced vibration.

What is claimed is:

1. A device for swinging power generation and vibration suppression by using arc-shaped wing plates with rough surfaces, comprising:
    a rotary swinging system, comprising a collector riser (1), two steering bearings (9) consisting of an upper steering bearing and a lower steering bearing, two nanometer material arc-shaped power generation wing plates (2), and two flexible tail plates (3); and
    a collector system, comprising three telescopic power generation cylinders, a waterproof electric slip ring (4), and a waterproof power transmission line (10), wherein the steering bearing (9) is of an inner-outer ring structure embedded with a cylindrical roller; an inside diameter of the steering bearing (9) is equal to an outside diameter of the collector riser (1); the two steering bearings (9) are mounted on an outer wall of the collector riser (1) at an interval of a height of each of the nanometer material arc-shaped power generation wing plates (2); two first cylindrical holes are symmetrically formed in an outer wall of each of the steering bearings (9); first cylindrical rotating shafts are respectively inserted into the two first cylindrical holes of each of the steering bearings (9);

one end of each of the nanometer material arc-shaped power generation wing plates (2) are mounted on the first cylindrical rotating shafts in a sleeving manner, such that the nanometer material arc-shaped power generation wing plates (2) are symmetrically mounted on two sides of the outer walls of the steering bearings (9) and concave surfaces of the nanometer material arc-shaped power generation wing plates face each other, and the convex surfaces of the nanometer material arc-shaped power generation wing plates face outside; the nanometer material arc-shaped power generation wing plates (2) drive outer rings of the steering bearings (9) to rotate around the collector riser (1), and also swing around the first cylindrical rotating shafts;

second cylindrical holes are formed in one end of each of the flexible tail plates (3); second cylindrical rotating shafts are respectively inserted into the second cylindrical holes; the flexible tail plates (3) are mounted at tail ends of respective nanometer material arc-shaped power generation wing plates (2) in a sleeving manner through the second cylindrical rotating shafts, such that the flexible tail plates (3) swing around the second cylindrical rotating shafts; a height and a thickness of each of the flexible tail plates (3) are respectively equal to the height and a thickness of each of the nanometer material arc-shaped power generation wing plates (2);

the waterproof electric slip ring (4) is mounted in a middle of the collector riser (1) between the two steering bearings (9); electric brush orbits and an electric energy transmission channel are formed in an outer wall of an inner ring of the waterproof electric slip ring (4); electric brushes arranged in two rows consisting of a female row and a male row are disposed on an inner wall of an outer ring of the waterproof electric slip ring (4); the electric brushes are in contact with the electric brush orbits in the outer wall of the inner ring; a first circuit channel interface is formed in an outer wall of the outer ring of the waterproof electric slip ring (4);

each telescopic power generation cylinder comprises a magnetic pole sleeve (12), four arc-shaped magnets (7), a spring (8), and two wing plate struts (11) each wound with a coil;

a second circuit channel interface of the magnetic pole sleeve (12) is connected to the first circuit channel interface of the waterproof electric slip ring (4) through the waterproof power transmission line (10);

wherein the nanometer material arc-shaped power generation wing plates (2) are made of a zinc oxide material; four rows of trumpet-shaped deflector holes (5) are uniformly formed in a plate surface of each of the nanometer material arc-shaped power generation wing plates (2) in a horizontal direction, such that hole openings in the concave surfaces of nanometer material arc-shaped power generation wing plates (2) are smaller than and hole openings in the convex surfaces of the corresponding nanometer material arc-shaped power generation wing plates (2); hemispherical bulges (6) are formed between every two rows of the trumpet-shaped deflector holes (5) in the convex surfaces of the nanometer material arc-shaped power generation wing plates (2); radiuses of the hemispherical bulges (6) are twice radiuses of the hole openings of the trumpet-shaped deflector holes (5) in the convex surfaces; the hemispherical bulges (6) are filled with zinc oxide material; cylindrical rotating shaft inserting holes are formed in both ends of each of the nanometer material arc-shaped power generation wing plates (2); three telescopic power generation cylinders are mounted in middles of the nanometer material arc-shaped power generation wing plates (2) at equal distances in a vertical direction;

the magnetic pole sleeve (12) is hollow, and has one spring (8) placed therein; two arc-shaped holes are symmetrically formed in an end surface of each side of the magnetic pole sleeve (12); arc-shaped magnets (7) are placed in arc-shaped holes respectively; magnetic poles of the arc-shaped magnets (7) in the two arc-shaped holes in a same end surface are opposite; the circuit channel interface is formed in a middle of the magnetic pole sleeve (12); and diameters of the wing plate struts (11) each wound with the coil is equal to an inner diameter of the magnetic pole sleeve (12); the wing plate struts (11) are respectively connected to two ends of the spring (8) in the magnetic pole sleeve (12); other ends of the wing plate struts (11) away from the spring (8) are respectively fixed to the concave surfaces of the nanometer material arc-shaped power generation wing plates (2) that are arranged opposite to each other.

2. A method for swinging power generation and vibration suppression by using arc-shaped wing plates with rough surfaces, using the device for swinging power generation and vibration suppression by using the arc-shaped wing plates with the rough surfaces according to claim 1, the method comprising:

rotating and extruding the nanometer material arc-shaped power generation wing plates (2) under an impact of a marine current to drive the steering bearings (9) to rotate until the nanometer material arc-shaped power generation wing plates (2) rotate to a counter flow side of the collector riser (1) when there are attack angles between the nanometer material arc-shaped power generation wing plates (2) and flow direction of a marine current;

promoting, by the nanometer material arc-shaped power generation wing plates (2), the telescopic power generation cylinders to stretch and retract while rotating the nanometer material arc-shaped power generation wing plates (2) to drive the steering bearings (9) to rotate, such that the arc-shaped magnets (7) and induction coils displace relatively to form induced current;

bending and deforming the nanometer material arc-shaped power generation wing plates (2) under the impact of the marine current to generate current due to dual effects of a semiconductor and piezoelectricity of zinc oxide and an electric potential generated at two ends of the zinc oxide when the zinc oxide wire is bent;

wherein under the combined action of the impact of the marine current and stretching and retracting of the springs (8), the nanometer material arc-shaped power generation wing plates (2) drive the flexible tail plates (3) to swing reciprocally, which destroys the shedding and development of a wake vortex of the collector riser (1);

the swinging of the nanometer material arc-shaped power generation wing plates (2) makes the trumpet-shaped deflector holes (5) produce a jet effect, which allocates a flow field at a tail of the collector riser (1), and destroys development of a boundary layer of the plate surface of the nanometer material arc-shaped power generation wing plate (2);

the hemispherical bulges (6) on the convex surfaces of the nanometer material arc-shaped power generation wing plates (2) increase surface roughness, and bring disturbance to a boundary layer around a flow;

the boundary layer around the flow of the collector riser (1) is deeply destroyed, a separation point of the boundary layer is changed, a three-dimensional structure of the wake vortex is destroyed, formation and development of the vortex are suppressed, and energy consumption-free vortex-induced vibration is suppressed under a combined action that the nanometer material arc-shaped power generation wing plates (2) divide a flowing space and adjust a flow direction, the nanometer material arc-shaped power generation wing plates (2) drive the flexible tail plates (3) to swing to destroy a tail vortex street, and the hemispherical bulges (6) and the trumpet-shaped deflector holes (5) disturb the boundary layer around flow; and bending and deforming the nanometer material arc-shaped power generation wing plates (2), deforming the hemispherical bulges (6), and reciprocally stretching and retracting the telescopic power generation cylinders produce current, which realizes conversion of marine current energy while suppressing the vibration induced by vortex.

\* \* \* \* \*